United States Patent
Shiraki

(10) Patent No.: US 10,404,586 B2
(45) Date of Patent: Sep. 3, 2019

(54) INFORMATION PROCESSING SYSTEM AND INFORMATION PROCESSING METHOD

(71) Applicant: FUJITSU LIMITED, Kawasaki-shi, Kanagawa (JP)

(72) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 379 days.

(21) Appl. No.: 14/632,629

(22) Filed: Feb. 26, 2015

(65) Prior Publication Data
US 2015/0341262 A1    Nov. 26, 2015

(30) Foreign Application Priority Data
May 23, 2014 (JP) .................................. 2014-107309

(51) Int. Cl.
 H04L 12/741 (2013.01)
 H04L 12/753 (2013.01)
 H04L 12/64 (2006.01)
(52) U.S. Cl.
 CPC .......... *H04L 45/74* (2013.01); *H04L 12/6418* (2013.01); *H04L 45/48* (2013.01)
(58) Field of Classification Search
 None
 See application file for complete search history.

(56) References Cited

U.S. PATENT DOCUMENTS

| | | | |
|---|---|---|---|
| 2007/0118568 A1* | 5/2007 | Kitani | H04L 41/0816 |
| 2010/0017497 A1 | 1/2010 | Brown et al. | |
| 2010/0020806 A1* | 1/2010 | Vahdat | H04L 45/00 370/395.31 |
| 2010/0316053 A1 | 12/2010 | Miyoshi et al. | |
| 2012/0057590 A1* | 3/2012 | Shiraki | H04L 12/2809 370/359 |

(Continued)

FOREIGN PATENT DOCUMENTS

| | | |
|---|---|---|
| JP | 2010-288168 | 12/2010 |
| JP | 2011-528205 | 11/2011 |
| JP | 2014-502126 | 1/2014 |

OTHER PUBLICATIONS

Office Action issued by the Japanese Patent Office dated Dec. 19, 2017 in corresponding Japanese patent application No. 2014-107309.

*Primary Examiner* — Jeffrey M Rutkowski
*Assistant Examiner* — Mehedi S Aley
(74) *Attorney, Agent, or Firm* — Staas & Halsey LLP

(57) ABSTRACT

An information processing system includes a plurality of nodes; a plurality of first switches respectively including information on a node to which the first switch is coupled; and a plurality of second switches respectively including information on an aggregation which the second switch is in charge of, wherein a first node transmits a first packet including destination information indicating that a destination is a second node, to a first switch coupled to the first node, and the first switch coupled to the first node transmits the first packet to a second switch that is in charge of an aggregation to which the second node belongs, when the second node is not coupled to the first switch, and the second switch transmits the first packet to a first switch coupled to the second node, and the first switch coupled to the second node transmits the first packet to the second node.

15 Claims, 18 Drawing Sheets

(56) References Cited

U.S. PATENT DOCUMENTS

| | | | |
|---|---|---|---|
| 2012/0155256 A1* | 6/2012 | Pope | G06F 13/128 |
| | | | 370/230 |
| 2012/0177041 A1 | 7/2012 | Berman | |
| 2014/0219277 A1* | 8/2014 | Bosshart | H04L 45/74 |
| | | | 370/392 |
| 2014/0307578 A1* | 10/2014 | DeSanti | H04L 41/0806 |
| | | | 370/254 |
| 2015/0055656 A1* | 2/2015 | Morimoto | H04L 12/4641 |
| | | | 370/392 |
| 2015/0312206 A1* | 10/2015 | Nakano | H04L 61/103 |
| | | | 370/392 |
| 2017/0070473 A1* | 3/2017 | Schlansker | H04L 12/6418 |

* cited by examiner

FIG. 3

| MATCH | | | ACTION | |
|---|---|---|---|---|
| DA | D-ID | OX-ID | MODIFY | FWD |
| $MAC_{FCF}$ | $FCID_{S1}$ | * | $DA \leftarrow MAC_{S1}$<br>$SA \leftarrow MAC_{FCF}$ | 1 |
| * | $FCID_{S1}$ | * | N/A | 1 |

FIG. 7

| MATCH | | | ACTION | |
|---|---|---|---|---|
| DA | D-ID | OX-ID | MODIFY | FWD |
| $MAC_{FCF}$ | $FCID_{S0}$ | * | DA ← $MAC_{S0}$<br>SA ← $MAC_{FCF}$ | 2 |
| * | $FCID_{S0}$ | * | N/A | 2 |
| * | ::*1 | *0 | N/A | 5 |
| * | ::*1 | *1 | N/A | 6 |
| * | ::*0 | *0 | N/A | 3 |
| * | ::*0 | *1 | N/A | 4 |

FIG. 8

| MATCH | | | ACTION | |
|---|---|---|---|---|
| DA | D-ID | OX-ID | MODIFY | FWD |
| $MAC_{FCF}$ | $FCID_{S1}$ | * | $DA \leftarrow MAC_{S1}$<br>$SA \leftarrow MAC_{FCF}$ | 3 |

FIG. 9

| MATCH | | | ACTION | |
|---|---|---|---|---|
| DA | D-ID | OX-ID | MODIFY | FWD |
| $MAC_{FCF}$ | $FCID_{S1}$ | * | $DA \leftarrow MAC_{S1}$<br>$SA \leftarrow MAC_{FCF}$ | 1 |
| * | $FCID_{S1}$ | * | N/A | 1 |
| * | ::*1 | *0 | N/A | 5 |
| * | ::*1 | *1 | N/A | 6 |
| * | ::*0 | *0 | N/A | 3 |
| * | ::*0 | *1 | N/A | 4 |

FIG. 14

| MATCH | | | ACTION | |
|---|---|---|---|---|
| DA | D-ID | OX-ID | MODIFY | FWD |
| * | $FCID_{S0}$ | * | $DA \leftarrow MAC_{S0}$<br>$SA \leftarrow MAC_{FCF}$ | 2 |
| * | ::*1 | *0 | N/A | 5 |
| * | ::*1 | *1 | N/A | 6 |
| * | ::*0 | *0 | N/A | 3 |
| * | ::*0 | *1 | N/A | 4 |

FIG. 15

| MATCH | | | ACTION | |
|---|---|---|---|---|
| DA | D-ID | OX-ID | MODIFY | FWD |
| * | $FCID_{S1}$ | * | N/A | 3 |

FIG. 16

| MATCH | | | ACTION | |
|---|---|---|---|---|
| DA | D-ID | OX-ID | MODIFY | FWD |
| * | $FCID_{S1}$ | * | $DA \leftarrow MAC_{S1}$<br>$SA \leftarrow MAC_{FCF}$ | 1 |
| * | ::*1 | *0 | N/A | 5 |
| * | ::*1 | *1 | N/A | 6 |
| * | ::*0 | *0 | N/A | 3 |
| * | ::*0 | *1 | N/A | 4 |

INFORMATION PROCESSING SYSTEM AND INFORMATION PROCESSING METHOD

CROSS-REFERENCE TO RELATED APPLICATION

This application is based upon and claims the benefit of priority of the prior Japanese Patent Application No. 2014-107309 filed on May 23, 2014, the entire contents of which are incorporated herein by reference.

FIELD

The embodiments discussed herein are related to an information processing system and an information processing method in an information communication network.

BACKGROUND

As a technology by which a Fibre Channel (FC) storage area network (SAN) is achieved on the Ethernet (registered trademark), there is Fibre Channel over Ethernet (FCoE). With the use of the FCoE, a SAN and a local area network (LAN) through the Ethernet, which have been deployed separately in a related art, may be integrated into a single network. With the use of the FCoE, the number of switches, the number of adapters, and the number of cables may be reduced by half, so that the simplification of network management may be achieved.

On the other hand, due to an increase in the number of servers that are installed in a data center, and an increase in the number of virtual servers using a virtualization technology, a problem occurs that the number of end nodes is increased. It is desirable that the performance of the network is improved when the number of end nodes is increased. However, there are many cases in which a network is constructed using a lot of switches each of which uses a relatively low-cost large scale integrated circuits (LSI) in order to improve the scale of the network.

Similar to the FC, in the FCoE, pieces of information on end nodes are managed by an FCoE Forwarder (FCF). In the FCoE, when the number of end nodes is increased, an area that stores pieces of information on end nodes, which is to be secured, is increased. However, as described above, when the relatively low-cost LSI is used, the storage capacity is limited. Therefore, the scale of the system is limited undesirably by employing the FCoE as is.

In the FCoE, two protocols are used. One of the protocols is an FCoE protocol. The FCoE protocol is a protocol that is related to a data plane of the FCoE. In the FCoE protocol, encapsulation and decapsulation of an FC packet (also referred to as an FC frame) in an Ethernet packet (also referred to as an Ethernet frame) are defined.

The other protocol is an FCoE Initialization Protocol (FIP). The FIP is a protocol that is related to a control plane of the FCoE. The FIP is used to find a device that is coupled to an Ethernet network and causes the FCoE to be operated by a control packet. The FIP defines log-in and log-out processes of an FC.

In certain literatures, decentralization of processing in the control plane of the FCoE has been considered. However, the data plane has not been considered in the literatures. As related arts, for example, Japanese National Publication of International Patent Application No. 2014-502126 and Japanese National Publication of International Patent Application No. 2011-528205 have been discussed.

SUMMARY

According to an aspect of the invention, an information processing system includes a plurality of nodes; a plurality of first switches coupled to at least one of the plurality of nodes, each of the first switches including first relay information that indicates information on a node to which the first switch is coupled; and a plurality of second switches each being coupled to the plurality of first switches, and each including second relay information that indicates information on an aggregation which the second switch is in charge of among a plurality of aggregations, wherein a first node among the plurality of nodes transmits a first packet that includes destination information indicating that a destination is a second node, to a first switch coupled to the first node among the plurality of first switches, and the first switch coupled to the first node transmits the first packet to a second switch that is in charge of an aggregation to which the second node belongs, among the plurality of second switches, based on the destination information and the first relay information when the second node is not coupled to the first switch coupled to the first node, and the second switch that is in charge of the aggregation to which the second node belongs transmits the first packet to a first switch coupled to the second node, among the plurality of first switches, based on the destination information and the second relay information, and the first switch coupled to the second node transmits the first packet to the second node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of an FCoE relay table;

FIG. 7 is a diagram illustrating an example of an FCoE relay table of a Leaf switch to which a transmission source end node is coupled in the first example;

FIG. 8 is a diagram illustrating an example of an FCoE relay table of a related Spine switch, in the first example;

FIG. 9 is a diagram illustrating an example of an FCoE relay table of a Leaf switch to which a destination end node is coupled, in the first example;

FIG. 14 is a diagram illustrating an example of an FCoE relay table of a Leaf switch to which a transmission source end node is coupled, in the second example;

FIG. 15 is a diagram illustrating an example of an FCoE relay table of a related Spine switch in the second example;

FIG. 16 is a diagram illustrating an example of an FCoE relay table of a Leaf switch to which a destination end node is coupled, in the second example;

DESCRIPTION OF EMBODIMENTS

Figure 1:
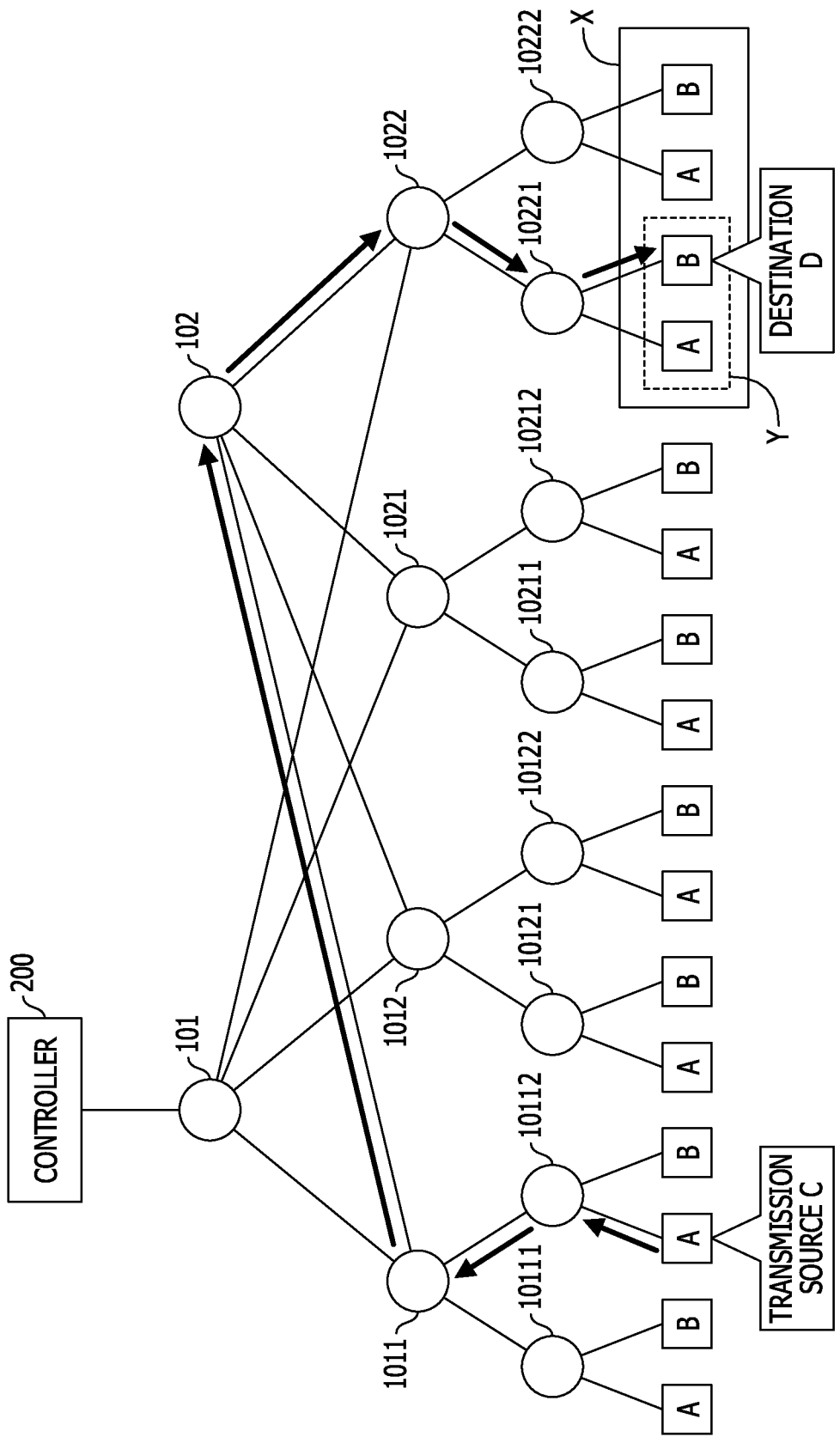
FIG. 1 is a diagram illustrating the outline of an embodiment.

The outline of an embodiment is described with reference to FIG. 1. In the embodiment, end nodes that are represented by the squares at the bottom in FIG. 1 are classified into a plurality of aggregations (here, two aggregations A and B). For example, it is only sufficient to use a part of an identifier (ID) that is included in each of the end nodes for the classification. In the network in the information processing system illustrated in FIG. 1, switches that are represented by circles are coupled in a tree-like structure. The network includes Spine switches 101 and 102, intermediate switches 1011 to 1022, and Leaf switches 10111 to 10222.

For example, the Leaf switches 10111 and 10112 are coupled to the intermediate switch 1011, and the Leaf switches 10121 and 10122 are coupled to the intermediate switch 1012. The Leaf switches 10211 and 10212 are coupled to the intermediate switch 1021, and the Leaf switches 10221 and 10222 are coupled to the intermediate switch 1022. In addition, each of the intermediate switches 1011 to 1022 is coupled to the Spine switches 101 and 102.

The Spine switch 101 is in charge of the end nodes of the aggregation A, and the Spine switch 102 is in charge of the end nodes of the aggregation B. That is, an amount of relay information that is to be held by each of the Spine switches 101 and 102 may be reduced by sharing relay of packets from the end nodes between the Spine switches 101 and 102.

In the network illustrated in FIG. 1, each of the intermediate switches 1011 to 1022 includes relay information of the end nodes that are provided under the control of each of the intermediate switches 1011 to 1022. For example, the intermediate switch 1022 includes pieces of relay information of the four end nodes that are enclosed by the solid line rectangle X. Similarly, each of the Leaf switches 10111 to 10222 includes pieces of relay information of the end nodes to which the Leaf switch is coupled. For example, the Leaf node 10221 includes pieces of relay information of the two end nodes that are enclosed by the dotted line rectangle Y.

In the example of FIG. 1, a controller 200 is coupled to the Spine switch 101. The controller 200 includes a direct or indirect path to each of the switches. The controller 200 collects topology information of the network, and IDs and pieces of location information of the end nodes, and instructs setting of relay information that is used in each of the switches.

Here, the outline of relay processing is described using an example in which a packet is transmitted from a transmission source end node C that is the third node from the left, to a destination end node D that is the third node from the right.

First, the transmission source end node C transmits a packet that is destined for the destination end node D, to the Leaf switch 10112. After that, the Leaf switch 10112 transmits the received packet to the intermediate switch 1011 after the Leaf switch 10112 has confirmed that the Leaf switch 10112 does not include relay information of the destination end node D, that is, that the destination end node D does not exist under the control of the Leaf switch 10112, and.

The intermediate switch 1011 transmits the received packet to the Spine switch 102 that is in charge of the aggregation B to which the destination end node D belongs after the intermediate switch 1011 has confirmed that the intermediate switch 1011 does not include the relay information of the destination end node D, that is, that the destination end node D does not exist under the control of the intermediate switch 1011.

The Spine switch 102 that is in charge of the aggregation B selects the intermediate switch 1022, based on the ID of the destination end node D and relay information that is held by the Spine switch 102. In addition, the Spine switch 102 transmits the received packet to the intermediate switch 1022.

The intermediate switch 1022 selects the Leaf switch 10221, also based on the ID of the destination end node D and relay information that is held by the intermediate switch 1022. In addition, the Spine switch 1022 transmits the received packet, to the Leaf switch 10221. In addition, the Leaf switch 10221 transmits the received packet to the destination end node D, also based on the ID of the destination end node D and relay information that is held by the Leaf switch 10221.

As described above, a switch (Spine switch in the example of FIG. 1) that corresponds to "turnaround point" is determined between an inlet port that is a port of the Leaf switch to which the transmission source end node is coupled and an exit port that is a port of the Leaf switch to which the destination end node is coupled. Here, a single switch that corresponds to "turnaround point" is provided for each of the aggregations as illustrated in FIG. 1, but a plurality of switches may be provided for each of the aggregations, in order to perform load decentralization or the like. Here, the communication between the input port and the output port is referred to as a communication flow.

In the embodiment, initially, as a destination media access control (MAC) address, a MAC address of the FCF (FCoE Forwarder) is set, but modification of the header is performed so that a MAC address of the destination end node is set as the destination MAC address, and the MAC address of the FCF is set as the transmission source MAC address in any switch between the turnaround point and the exit port in the communication flow. In the following description, an example in which the modification is performed in the Spine switch that corresponds to the turnaround point and an example in which the modification is performed in the Leaf switch that includes the exit port are described.

The switch between the inlet port and the turnaround point in the communication flow performs the transfer of a packet using a part of information that is used to identify an end node aggregation of which a switch that corresponds to the turnaround point is in charge, that is, an FC Destination ID (D-ID) (FC-ID) of the destination end node. When a plurality of switches each of which corresponds to the turnaround point exists for a single end node aggregation, the load decentralization may be achieved using an FC Source ID (S-ID) (FC-ID) of the transmission source end node, an exchange ID (FC Exchange ID (OX-ID) or ID on communication management, which is included in the header of the FC frame), and the like, in addition to the FC-ID of the destination end node.

In the FCoE, the FCF includes both functions of control plane and the data plane. The control plane is a function that exchanges a control packet that is used for the log-in processing through the FIP, and obtains the location information of the end node. The data plane is a function that executes relay processing of a data packet by the FCoE protocol, based on the location information of the end node.

The FC-ID is an ID of an FC port, and is used for routing in the FC. The FC-ID is specified by 3 octets. For example, when the FC-ID is 0xXXYYZZ in hexadecimal, "XX" indicates a Domain ID, and "YY" indicates an Area ID, and "ZZ" indicates a Port ID. In the FC, the Domain ID is individually provided for each of the switches when a plurality of FC switches (FC-SW) forms a SAN. The Domain ID corresponds to 8 bits, and allows 239 switches to be coupled to each other at maximum in the network.

The controller 200 according to the embodiment may include the topology information of the network, in addition to the pieces of location information of the end nodes, which are included in a known FCF. The topology information may be collected automatically or may be set by an administrator. On the other hand, the controller 200 does not include a data plane function. However, the controller 200 may be obtained by extending a control plane function of the FCF. In addition, as illustrated in FIG. 1, separately from the Spine switches 101 and 102 each of which operates as the FCF, the controller 200 may obtain the pieces of location information and the like, from the FCF.

Figure 2:
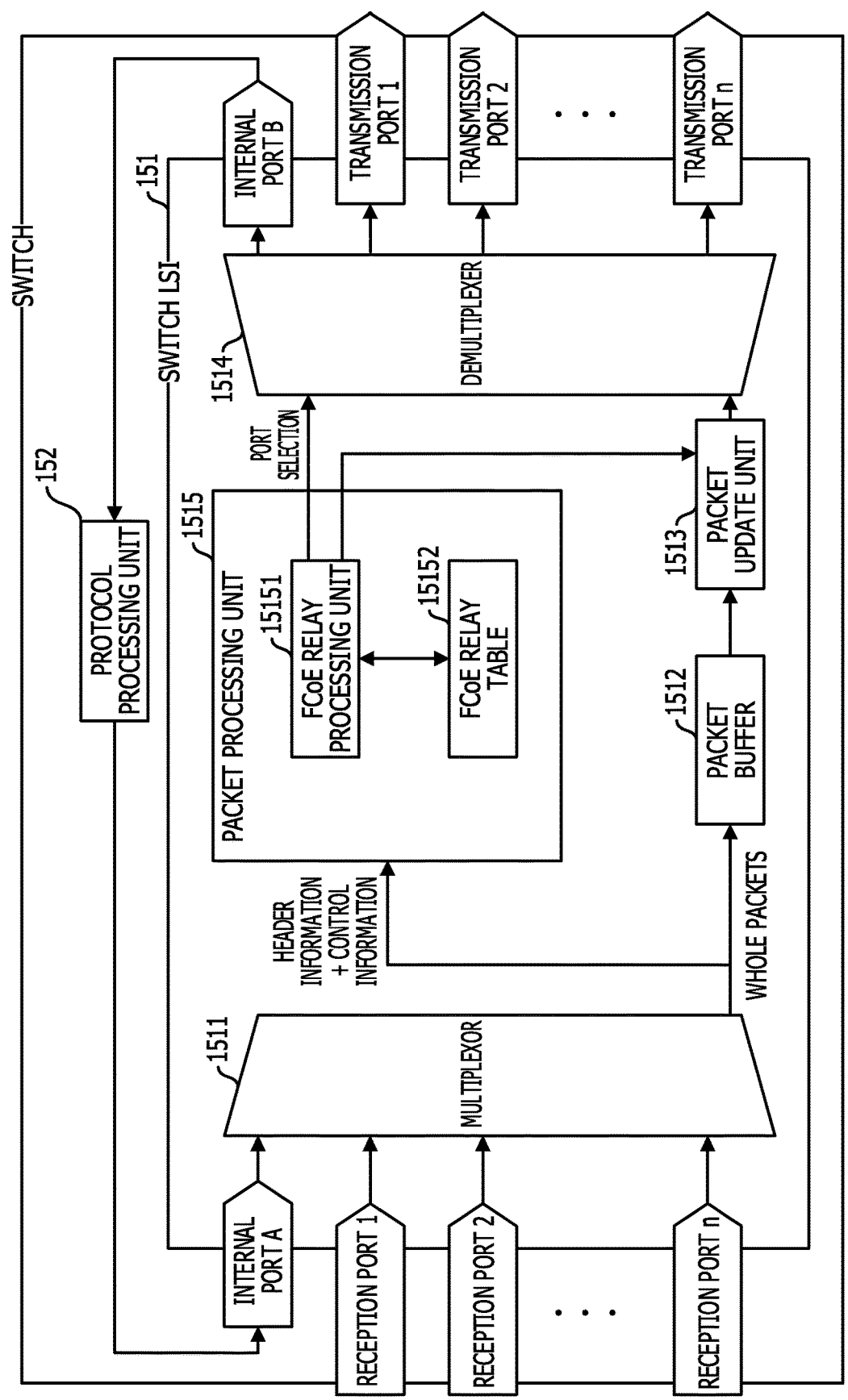
FIG. 2 is a functional block diagram of a switch according to the embodiment.

FIG. 2 illustrates a basic functional block diagram of the switch according to the embodiment.

The switch according to the embodiment includes reception ports 1 to n each of which is coupled to an external device and receives a packet from the external device, transmission ports 1 to n each of which is coupled to an external device and transmits a packet to the external device, a switch LSI 151, and a protocol processing unit 152 that is achieved, for example, by combining a processor and a program. The protocol processing unit 152 may be achieved by a dedicated LSI.

The protocol processing unit 152 is coupled to the switch LSI 151 through an internal port A and an internal port B. The protocol processing unit 152 executes processing for establishment of the connection, monitoring of the protocol, instruction to the switch LSI 151, or the like. Such processing is not related to the embodiment directly, so that the description is omitted herein.

The switch LSI 151 includes a multiplexer 1511 that is coupled to the reception ports 1 to n and the internal port A, a packet buffer 1512, a packet processing unit 1515, a packet update unit 1513, a demultiplexer 1514 that is coupled to the transmission ports 1 to n and the internal port B.

The whole packets that have been received at the multiplexer 1511 are stored in the packet buffer 1512. The control information and header information included in the packet that has been received at the multiplexer 1511 are output to the packet processing unit 1515.

The packet update unit 1513 executes processing of updating the header of the packet, in response to an instruction from the packet processing unit 1515 (also referred to as modification processing or conversion processing). The demultiplexer 1514 outputs the packet through the transmission port that has been selected in response to a port selection instruction from the packet processing unit 1515.

The packet processing unit 1515 includes an FCoE relay processing unit 15151 and an FCoE relay table 15152, as configuration elements that are related to the embodiment.

The packet processing unit 1515 executes packet identification processing, processing for the Ethernet, or the like. However, the packet processing unit 1515 is not the main part of the embodiment, so that the description is omitted herein.

An example of the FCoE relay table 15152 is illustrated in FIG. 3. In the FCoE relay table 15152, a condition portion that is indicated as "Match", and processing that is indicated as "Action" and is to be executed when the condition is satisfied are defined.

More specifically, the Match field includes a DA field, a D-ID field, and an OX-ID field. The DA field is a field to which a MAC address is set that is to be checked against a destination MAC address (DA) of a destination end node in the received packet. The D-ID field is a field to which an FC-ID is set that is to be checked against an FC-ID of the destination end node in the received packet. The OX-ID field is a field to which an OX-ID is set that is to be checked against an exchange ID of the FC in the received packet.

In the example of FIG. 3, the first row indicates a condition in which the DA indicates a MAC address of the FCF, and the D-ID indicates an FC-ID of an end node S1, in the received packet. Here, "*" indicates a wild card, and it is determined that any value is matched. In addition, "N/A" indicates that there is no application. In the example of FIG. 3, in the second row, the D-ID indicates the FC-ID of the end node S1.

The Action field includes a Modify field in which modification processing of the header of the received packet is defined, and a Fwd field that indicates a transfer destination port number of the packet. In the first row of FIG. 3, processing is defined in which the MAC address of the destination end node S1 is set as the DA, and the MAC address of the FCF is set as a source address (SA) that is the MAC address of the transmission source, and it is defined that the received packet is output to a transmission port 1. In the second row of FIG. 3, it is determined that the modification of the header is not desired, and the received packet is output to the transmission port 1.

In such an FCoE relay table 15152, the higher row has a high priority level. The condition that is defined in the Match field is checked against each cell from the top row through the lower row, and processing is executed that is defined in a row with which the matching has been performed successfully first.

Figure 4:
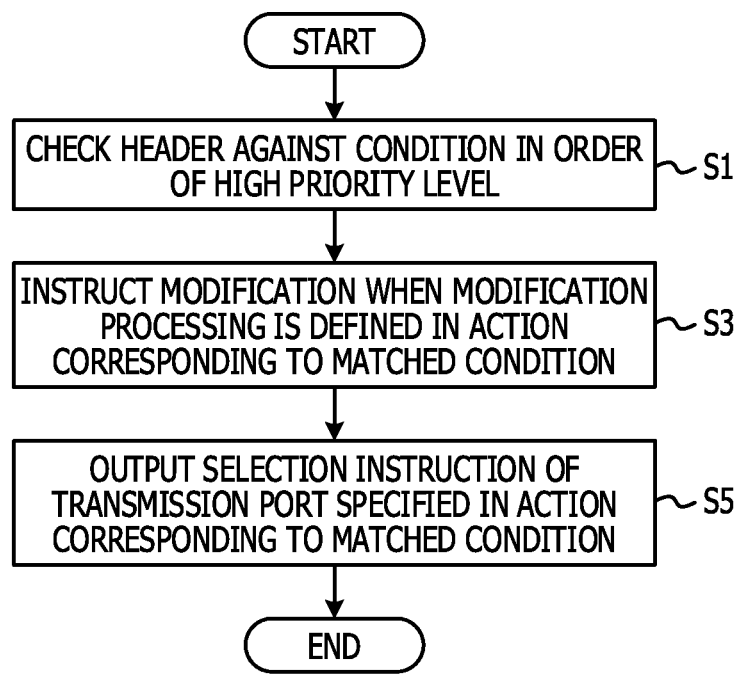
FIG. 4 is a diagram illustrating a processing content of the switch.

A processing content of the FCoE relay processing unit 15151 of the packet processing unit 1515 is described with reference to FIG. 4.

First, the FCoE relay processing unit 15151 checks headers of a received packet (header of the MAC frame portion and the headers of the FC frame portion) against the conditions that are defined in the Match field in the FCoE relay table 15152, in order from the high priority level. In addition, the row having the condition with which the matching has been performed successfully first is identified (S1).

In addition, when the modification processing (Modify) is defined in the Action field that corresponds to the condition with which the row has been matched, the FCoE relay processing unit 15151 instructs the defined modification to the packet update unit 1513 (S3). The packet update unit 1513 executes the above-described modification processing of the header for the packet that is stored in the packet buffer 1512, in response to the instruction, and then outputs data of the packet after modification to the demultiplexer 1514. When there is no instruction, the packet update unit 1513 outputs the packet that is stored in the packet buffer 1512, to the demultiplexer 1514, as is.

In addition, the FCoE relay processing unit 15151 outputs a port selection instruction of a transmission port that has been specified in the Action field that corresponds to the condition with which the row has been matched, to the demultiplexer 1514 (S5). Therefore, the demultiplexer 1514 outputs the packet that has been transmitted from the packet update unit 1513, to the specified transmission port.

First Example

Figure 5:
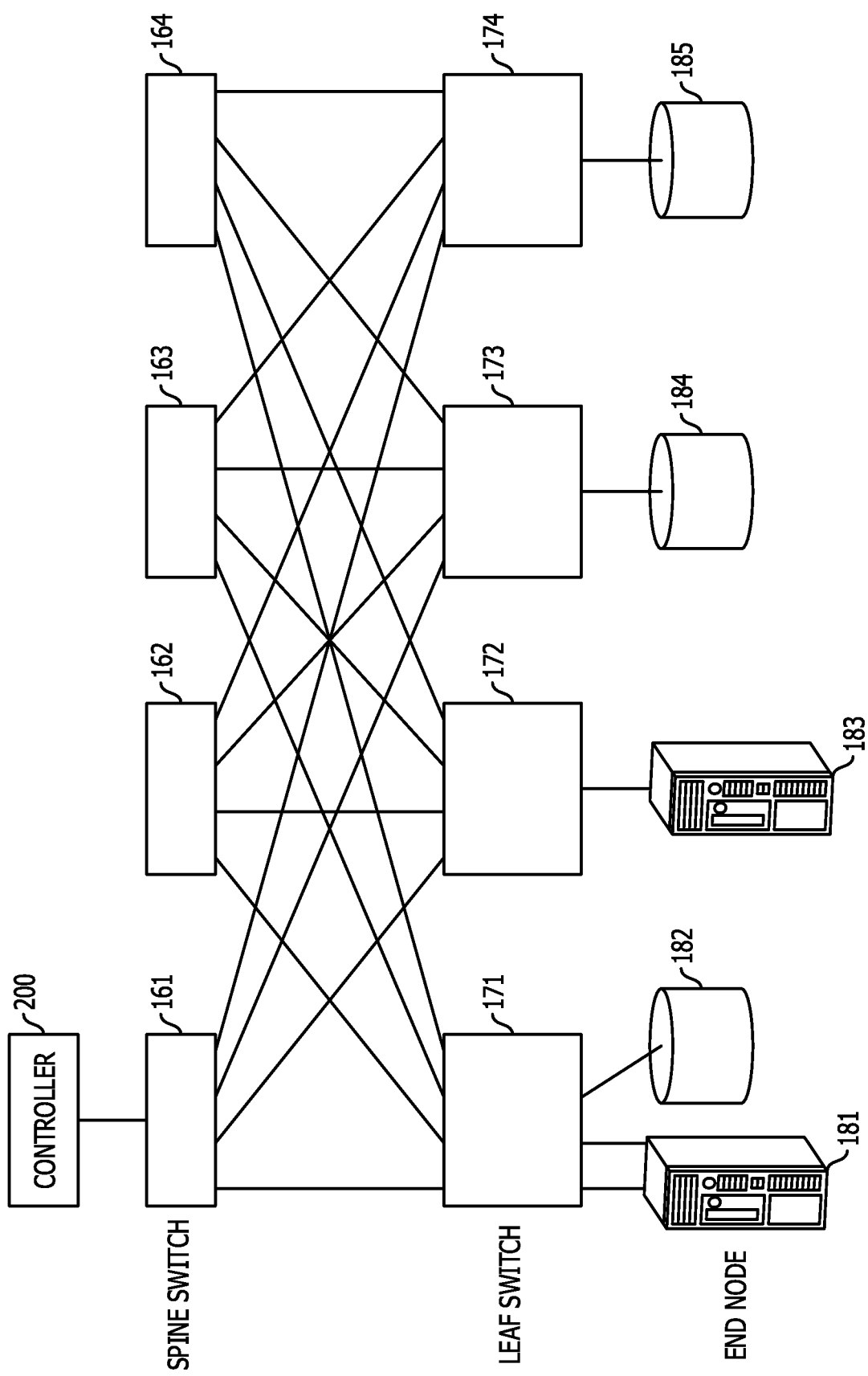
FIG. 5 is a diagram illustrating a configuration example of an information processing system according to examples.

A case is described below in which the outline of the above-described embodiment is applied to an information processing system as illustrated in FIG. 5.

A network of FIG. 5 is a two-stage Clos-network. The network includes four Spine switches 161 to 164 and four Leaf switches 171 to 174. Each of the Leaf switches is coupled to the Spine switches. A server 181 and a disk device 182 as end nodes are coupled to the Leaf switch 171, and a server 183 as an end node is coupled to the Leaf switch 172. A disk device 184 is coupled to the Leaf switch 173, and a disk device 185 is coupled to the Leaf switch 174. The controller 200 is coupled to the Spine switch 161.

Figure 6:
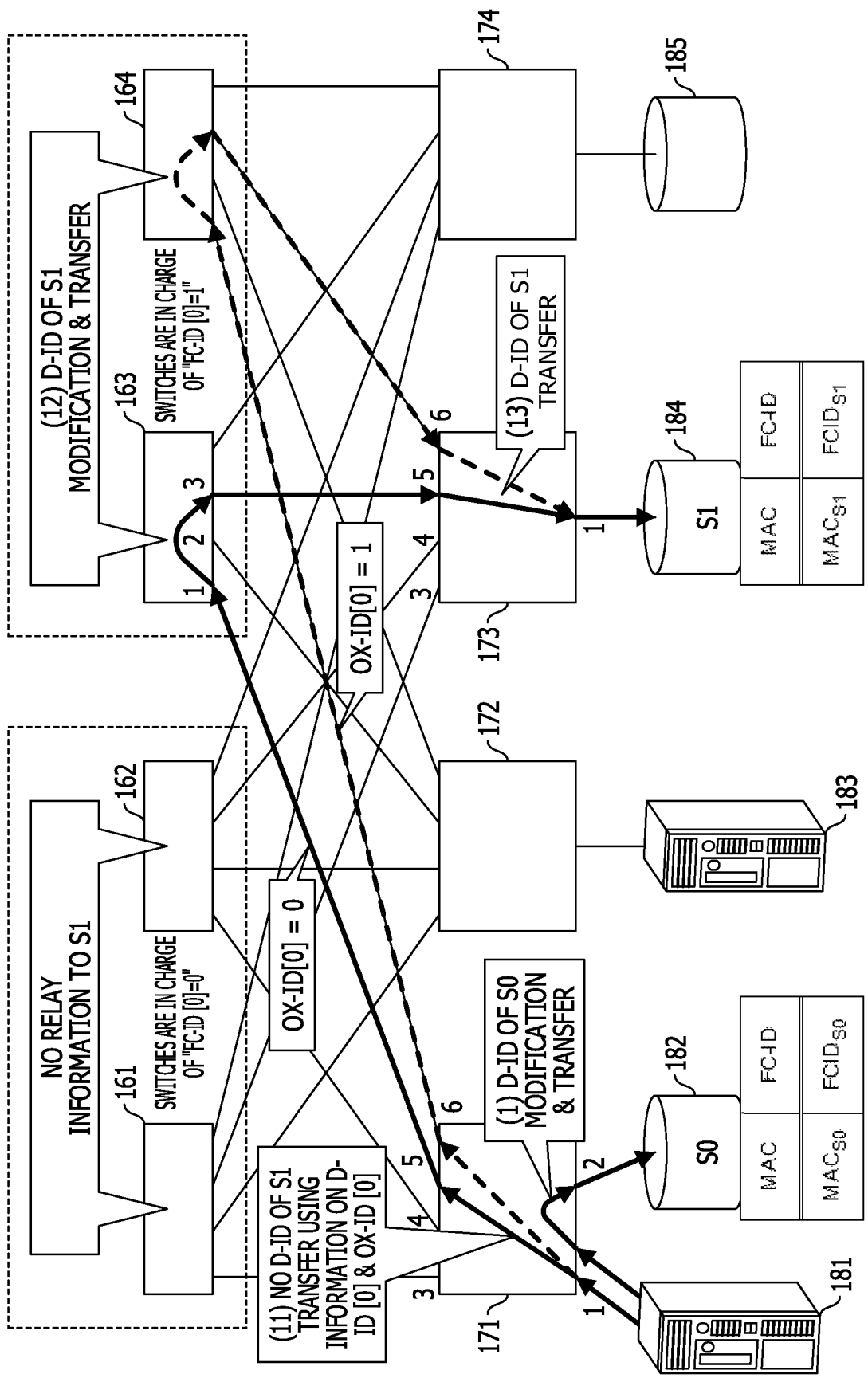
FIG. 6 is a diagram illustrating the outline of a first example.

In this example, as schematically illustrated in FIG. 6, the Spine switches 161 and 162 are in charge of an aggregation of end nodes in which the least significant bit value of the FC-ID is 0 ("FC-ID [0]=0"). The Spine switches 163 and 164 are in charge of an aggregation of end nodes of "FC-ID [0]=1".

For example, it is assumed that the name of the disk device 184 is S1, and the least significant bit value of the FC-ID is "1". It is assumed that the FC-ID of the disk device 184 (S1) is represented as "$FCID_{S1}$", and the MAC address of the disk device 184 (S1) is represented as "$MAC_{S1}$".

As described above, the Spine switches 163 and 164 are in charge of the disk device 184 (S1), and holds relay information to the disk device 184 (S1). That is, the Spine switches 163 and 164 holds a D-ID of the disk device 184 (S1), and performs modification of the header and transfer of the packet.

On the other hand, it is assumed that the name of the disk device 182 is S0, and the least significant bit value of the FC-ID is "0". It is assumed that the FC-ID of the disk device 182 (S0) is represented as "$FCID_{S0}$", and the MAC address of the disk device 182 (S0) is represented as "$MAC_{S0}$".

The Spine switches 161 and 162 are in charge of such a disk device 182 (S0), and holds relay information to the disk device 182 (S0). That is, the Spine switches 161 and 162 holds a D-ID of the disk device 182 (S0), and performs modification of the header and transfer of the packet.

In this example, redundant Spine switches are provided for each of the aggregations, and the load decentralization may be performed. More specifically, the Spine switches are switched depending on whether or not the least significant bit value of the OX-ID is "1" ("OX-ID [0]=1"). As illustrated in FIG. 6, when "OX-ID[0]=1" is satisfied in the received packet, the Spine switch 164 is in charge of the received packet. When "OX-ID [0]=0" is satisfied in the received packet, the Spine switch 163 is in charge of the received packet.

The Spine switches 161 and 162 are divided into the Spine switch 162 that is in charge of "OX-ID [0]=1" and the Spine switch 161 that is in charge of "OX-ID [0]=0".

Processing in a case in which the server 181 transmits the packet to the disk device 184 (S1) in such an information processing system (first case) is described below. In such a packet, "OX-ID [0]=0" is satisfied.

Processing in a case in which the server 181 transmits the packet to the disk device 182 (S0) in such an information processing system (second case) is also described below.

The FCoE relay table 15152 of the Leaf switch 171 includes data as illustrated in FIG. 7.

The first row of FIG. 7 indicates relay information when a packet to the disk device 182 (S0) is received from the server 181 or the like under the control of the Leaf switch 171. That is, the first row indicates that the DA of the received packet is modified to "$MAC_{S0}$", and the SA is modified to "$MAC_{FCF}$", and the received packet is output to the transmission port "2" when the DA is "$MAC_{FCF}$", and the D-ID is "$FCID_{S0}$". As illustrated in FIG. 6, to the transmission port "2", the disk device 182 (S0) is coupled.

The second row indicates relay information when the packet to the disk device 182 (S0) is received in a case other than the case of the first row. More specifically, the second row is relay information when the packet to the disk device 182 (S0) is received from the Spine switch. That is, the second row indicates that the received packet is transmitted to the transmission port "2" without updating the header when the D-ID of the received packet is "$FCID_{S0}$". As illustrated in FIG. 6, to the transmission port "2", the disk device 182 (S0) is coupled.

The third row indicates that the received packet is output to the transmission port "5" without updating the header when the least significant bit value of the D-ID of the received packet is "1", and the least significant bit of the OX-ID is "0". To the transmission port "5", the Spine switch 163 is coupled.

The fourth row indicates that the received packet is output to the transmission port "6" without updating the header when the least significant bit value of the D-ID of the received packet is "1", and the least significant bit of the OX-ID is "1". To the transmission port "6", the Spine switch 164 is coupled.

The fifth row indicates that the received packet is output to the transmission port "3" without updating the header when the least significant bit value of the D-ID of the received packet is "0", and the least significant bit of the OX-ID is "0". To the transmission port "3", the Spine switch 161 is coupled.

The sixth row indicates that the received packet is output to the transmission port "4" without updating the header when the least significant bit value of the D-ID of the received packet is "0", and the least significant bit of the OX-ID is "1". To the transmission port "4", the Spine switch 162 is coupled.

As described above, in the FCoE relay table 15152 of the Leaf switch 171, relay information of the individual D-ID is included, for the end nodes under the control of the Leaf switch 171, but relay information to the Spine switch that is a transfer destination is merely included, for each combination between the least significant bit value of the D-ID and the least significant bit value of the OX-ID, for end nodes other than the end nodes under the control of the Leaf switch 171.

Thus, in the above-described second case, the header of the received packet is matched with the condition of the first row in the FCoE relay table 15152 of the Leaf switch 171 (FIG. 7). The Leaf switch 171 executes the above-described modification processing of the header (also referred to as conversion processing), and outputs the received packet to the transmission port "2" (Step (1)).

On the other hand, in the first case, in the Leaf switch 171, the header of the received packet is matched with the condition of the third row. That is, the least significant bit value of the FC-ID of the disk device 184 (S1) that is the destination end node is "1", and the least significant bit value of the OX-ID is "0". Thus, the Leaf switch 171 outputs the received packet to the transmission port "5" to which the Spine switch 163 is coupled, without updating the header (Step (11)).

In the FCoE relay table 15152 of the Spine switch 163, data as illustrated in FIG. 8 is included. That is, when the DA of the received packet is "$MAC_{FCF}$" that is the MAC address of the FCF, and the D-ID is "$FCID_{S1}$", the DA is modified to "$MAC_{S1}$", and the SA is modified to "$MAC_{FCF}$", and the received packet is transmitted to the transmission port "3" to which the Leaf switch 173 is coupled. As described above, in the FCoE relay table 15152 of the Spine switch 163, relay information of the FC-ID of an end node that belongs to the aggregation of which the Spine switch 163 is in charge, is included.

In the Spine switch 163 that has received the packet from the Leaf switch 171, the DA of the received packet is "$MAC_{FCF}$", and the D-ID is "$FCID_{S1}$". Therefore, the Spine switch 163 executes processing of setting the MAC address "$MAC_{S1}$" of the disk device 184 (S1), to the DA of the received packet, and setting "$MAC_{FCF}$" that is the MAC address of the FCF, to the SA. In addition, the Spine switch 163 transmits the packet after the modification from the transmission port "3" to the Leaf switch 173 (Step (12)).

The FCoE relay table 15152 of the Leaf switch 173 includes data as illustrated in FIG. 9.

The first row of FIG. 9 indicates relay information when the packet to the disk device 184 (S1) is received from the server 181 or the like under the control of the Leaf switch 171. That is, the first row indicates that the DA of the received packet is modified to "$MAC_{S1}$", and the SA is modified to "$MAC_{FCF}$", and the received packet is output to the transmission port "1" when the DA is "$MAC_{FCF}$", and the D-ID is "$FCID_{S1}$". As illustrated in FIG. 6, the disk device 184 (S1) is coupled to the transmission port "1".

The second row indicates relay information when the packet to the disk device 184 (S1) is received in a case other than the case of the first row. More specifically, the second row indicates relay information when the packet to the disk device 184 (S1) is received from the Spine switch. That is, the second row indicates that the received packet is output to the transmission port "1" without updating the header when the D-ID of the received packet is "$FCID_{S1}$". As illustrated in FIG. 6, to the transmission port "1", the disk device 184 (S1) is coupled.

The third row indicates that the received packet is output to the transmission port "5" without updating the header when the least significant bit value of the D-ID of the received packet is "1", and the least significant bit of the OX-ID is "0". To the transmission port "5", the Spine switch 163 is coupled.

The fourth row indicates that the received packet is output to the transmission port "6" without updating the header when the least significant bit value of the D-ID of the received packet is "1", and the least significant bit of the OX-ID is "1". To the transmission port "6", the Spine switch 164 is coupled.

The fifth row indicates that the received packet is output to the transmission port "3" without updating the header when the least significant bit value of the D-ID of the received packet is "0", and the least significant bit of the OX-ID is "0". To the transmission port "3", the Spine switch 161 is coupled.

The sixth row indicates that the received packet is output to the transmission port "4" without updating the header when the least significant bit value of the D-ID of the received packet is "0", and the least significant bit of the OX-ID is "1". To the transmission port "4", the Spine switch 162 is coupled.

As described above, in the FCoE relay table 15152 of the Leaf switch 173, relay information of the individual D-ID is included, for the end nodes under the control of the Leaf switch 173. However, relay information to the Spine switch that is the transfer destination is merely included, for each combination between the least significant bit value of the D-ID and the least significant bit value of the OX-ID, for end nodes other than the end nodes under the control of the Leaf switch 173.

When the Leaf switch 173 receives the packet after the modification, from the Spine switch 163, the Leaf switch 173 outputs the received packet to the associated transmission port "1", in accordance with the second row of the FCoE relay table 15152 because the D-ID is "$FCID_{S1}$" (Step (13)).

As described above, the transfer of the packet is performed. However, in the FCoE relay table 15152 of the Spine switch, an entry of the end node that belongs to the aggregation of which the Spine switch is in charge, is merely included. Therefore, the processing is dealt with even when the capacity of a memory in the Spine switch is small. Also, in the Leaf switch, each end node other than the end nodes under control of the Leaf switch merely holds relay information that are used to perform the transfer to the Spine switch that is the FCF, and the relay information is also identified by a part of the D-ID and a part of the OX-ID. Therefore, the processing is dealt with even when the capacity of a memory in the Leaf switch is small.

When "OX-ID [0]=1" is satisfied, as illustrated in the communication flow that is indicated by the dotted line in FIG. 6, the Leaf switch 171 transfers the packet from the transmission port "6" to the Spine switch 164. In addition, similar to the Spine switch 163, the Spine switch 164 performs the modification of the header, and transmits the packet to the Leaf switch 173.

Figure 10:
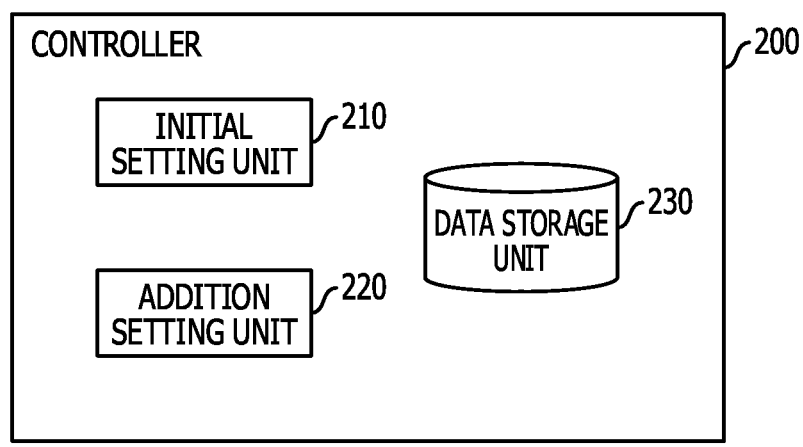
FIG. 10 is a diagram illustrating a function block configuration of a controller in the examples.

The controller 200 that performs the setting of the FCoE relay table 15152 as illustrated in FIGS. 7 to 9 includes a configuration as illustrated in FIG. 10.

The controller 200 includes an initial setting unit 210, an addition setting unit 220, and a data storage unit 230.

The initial setting unit 210 executes processing of setting relay information related to a direction from a Leaf switch to a Spine switch.

The addition setting unit 220 executes processing of setting relay information related to a direction from a Spine switch to a Leaf switch each time an end node is added.

The data storage unit 230 stores setting data such as the number of sections, pieces of location information (address information) of end nodes, and the topology information of the network.

Figure 11:
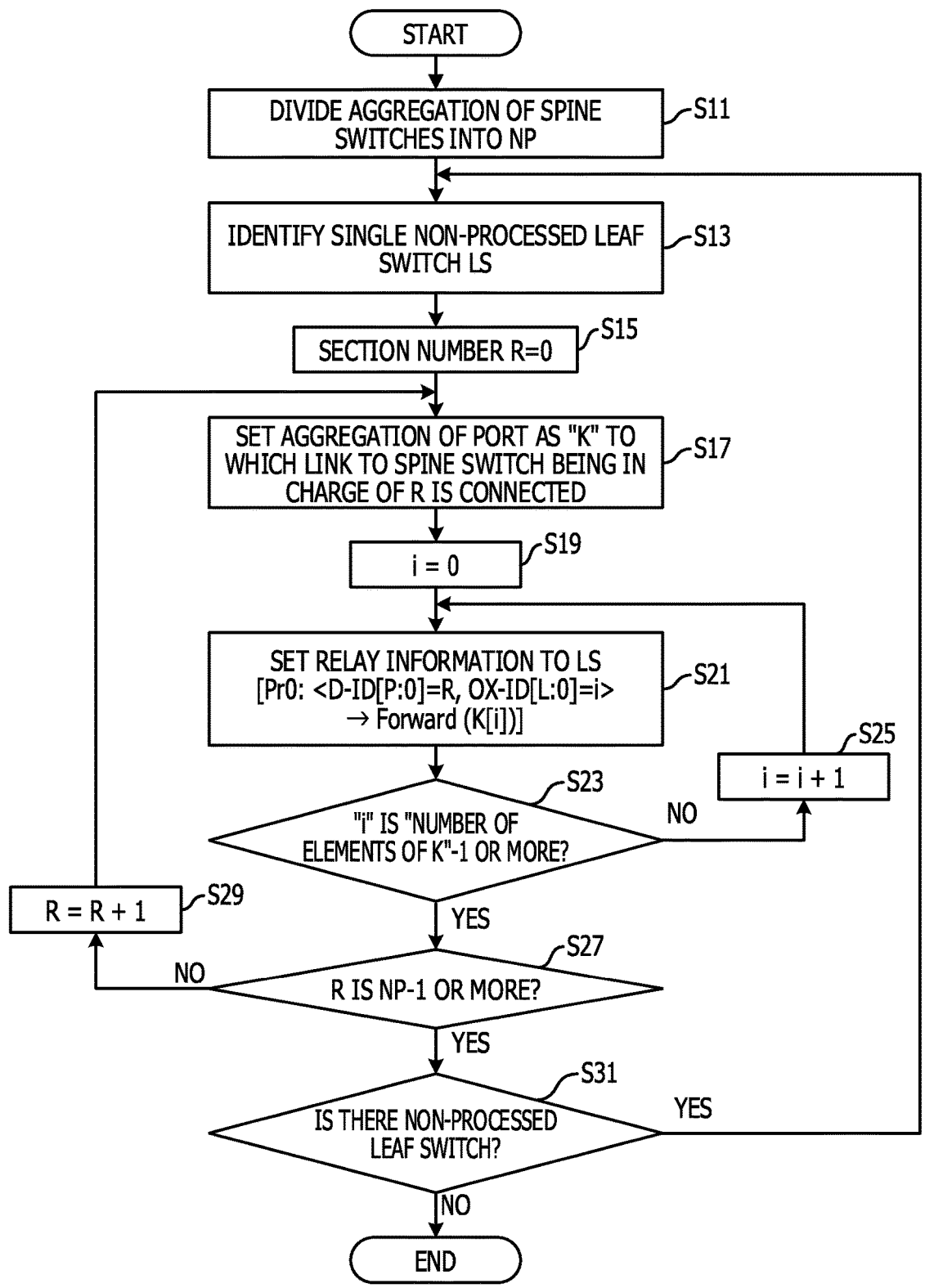
FIG. 11 is a diagram illustrating a processing flow of processing of an initial setting unit.

A processing content of the initial setting unit 210 is described below with reference to FIG. 11.

First, the initial setting unit 210 divides an aggregation of Spine switches, into the number of sections NP (S11). For example, when end nodes are classified using the FC-ID [P:0], that is, the P-th bit (starting from "P=0") from the least significant bit of the FC-ID, "$NP=2^{P+1}$" is satisfied. In the example of FIG. 6, "P=0" and "NP=2" are satisfied.

In addition, the initial setting unit 210 identifies a single non-processed Leaf switch LS, from among an aggregation of Leaf switches (S13).

In addition, the initial setting unit 210 sets a counter R of the section number, at 0 (S15).

After that, the initial setting unit 210 identifies an aggregation of ports to which a link to a Spine switch is coupled that is in charge of an aggregation having the section number R, from among a plurality of ports that are included in the identified Leaf switch LS, and set the identified aggregation as an aggregation K (S17).

The initial setting unit 210 initializes a counter i of the link, at 0 (S19). In addition, the initial setting unit 210 performs setting of relay information on the identified Leaf switch LS (S21). More specifically, processing is set as relay information, in which the received packet is output to a transmission port to which the i-th link is coupled in the aggregation K when the P-th bit from the least significant bit of the D-ID of a received packet is "R", and the L-th bit from the least significant bit of the OX-ID (starting from "L=0") is "i" ("D-ID [P:0]=R" and "OX-ID [L:0]=i"), using a priority level "0" (Pr0). When a format of "Pr<priority level>:<comparison condition>→processing" is described, "Pr0:<D-ID [P:0]=R, OX-ID [L:0]=i>→Forward (K [i])" is obtained. It is assumed that a link to a Spine switch that is in charge of a single aggregation exists by $2^{L+1}$. In the example of FIG. 6, "L=0" is satisfied, the number of links from each of the Leaf switches to two Spine switches that are in charge of a single aggregation is two.

It is assumed that the priority level becomes lower as the number becomes smaller.

In addition, the initial setting unit 210 determines whether or not "i" is "number of elements of K"−1 or more (S23). When "i" is not "number of elements of K"−1 or more, the initial setting unit 210 increments "i" by 1 (S25), and the flow returns to S21.

On the other hand, when "i" is "number of elements of K"−1 or more, the initial setting unit 210 determines whether or not "R" is "number of sections NP"−1 or more (S27). When "R" is not "number of sections NP"−1 or more, the initial setting unit 210 increments "R" by 1 (S29), and the flow proceeds to S17.

On the other hand, when "R" is "number of sections NP"−1 or more, the initial setting unit 210 determines whether or not a non-processed Leaf switch exists in the aggregation of the Leaf switches (S31). When a non-processed Leaf switch exists in the aggregation of the Leaf switches, the flow returns to S13. On the other hand, a non-processed Leaf switch does not exist in the aggregation of the Leaf switches, the processing ends.

Due to execution of such processing, pieces of data of the third row to the sixth row in FIGS. 7 and 9 are set.

Figure 12:
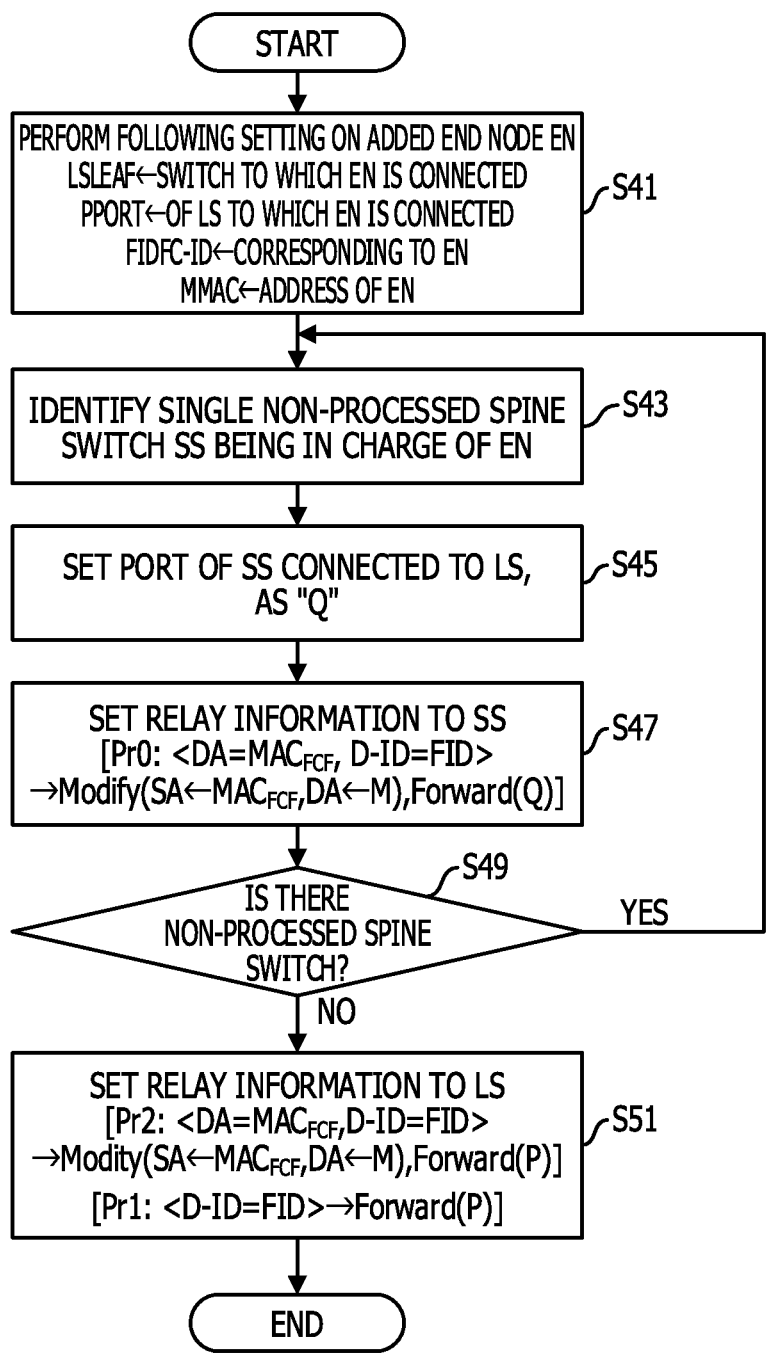
FIG. 12 is a diagram illustrating a processing flow of processing of an addition setting unit in the first example.

A processing content of the addition setting unit 220 is described below with reference to FIG. 12. The following processing is executed each time an end node is added to the information processing system.

First, the addition setting unit 220 performs the following setting on the added end node EN (S41). More specifically, the addition setting unit 220 sets the Leaf switch to which the end node EN is coupled, as "LS". The addition setting unit 220 sets a port of the Leaf switch LS to which the end node EN is coupled, as "P". The addition setting unit 220 sets the FC-ID that corresponds to end node EN, as "FID". The addition setting unit 220 sets a MAC address of the end node EN as "M".

In addition, the addition setting unit 220 identifies a single non-processed Spine switch SS, from among the Spine switches that are in charge of the end node EN (S43). The addition setting unit 220 sets a port of the SS that is coupled to the LS as "Q" (S45).

In addition, the addition setting unit 220 performs setting of relay information on the identified Spine switch SS (S47).

Relay information is set in which the SA of the received packet is modified to "$MAC_{FCF}$", and the DA is modified to "M", and the received packet is output to the transmission port Q when the DA of the received packet is "$MAC_{FCF}$", and the D-ID is "FID" ("DA=$MAC_{FCF}$" and "D-ID=FID"), using the priority level 0 (Pr0). In accordance with the above-described notation, "Pr0:<DA=$MAC_{FCF}$, D-ID=FID>→Modify(SA←$MAC_{FCF}$, DA←M), Forward (Q)" is obtained. "Modify ( )" indicates processing in which the modification indicated in the parentheses is performed.

After that, the addition setting unit 220 determines whether or not a non-processed Spine switch exists in the Spine switches that are in charge of the end node EN (S49). When a non-processed Spine switch exists, the flow returns to S43.

The relay information as described with reference to FIG. 8 is set by executing such processing.

On the other hand, when a non-processed Spine switch does not exist, the addition setting unit 220 performs setting of relay information on the Leaf switch LS to which the end node EN is coupled (S51). More specifically, relay information is set in which "$MAC_{FCF}$" is set as the SA of the received packet, and "M" is set as the DA, and the packet after the modification is output to the port P when the DA of the received packet is "$MAC_{FCF}$", and the D-ID is "FID" ("DA=$MAC_{FCF}$" and "D-ID=FID"), using a priority level 2 (Pr2). In accordance with the above-described notation, "Pr2:<DA=$MAC_{FCF}$, D-ID=FID>→Modify (SA←$MAC_{FCF}$, DA←M), Forward (P)" is obtained. Therefore, the first rows of FIGS. 7 and 9 are set.

In addition, relay information is set in which the received packet after the modification is output to the transmission port P when the D-ID of the received packet is "FID" (D-ID=FID), using a priority level 1 (Pr1). In accordance with the above-described notation, "Pr1:<D-ID=FID>→Forward (P)" is obtained. Therefore, the second rows of FIGS. 7 and 9 are set.

As described above, when the controller 200 executes the processing, the above-described transfer processing of a packet is executed.

Second Example

In the first example, the case is described in which the modification of the header is performed by a Spine switch, but the modification of the header may be performed merely by a Leaf switch.

Description is made below using the information processing system as illustrated in FIG. 5.

Figure 13:
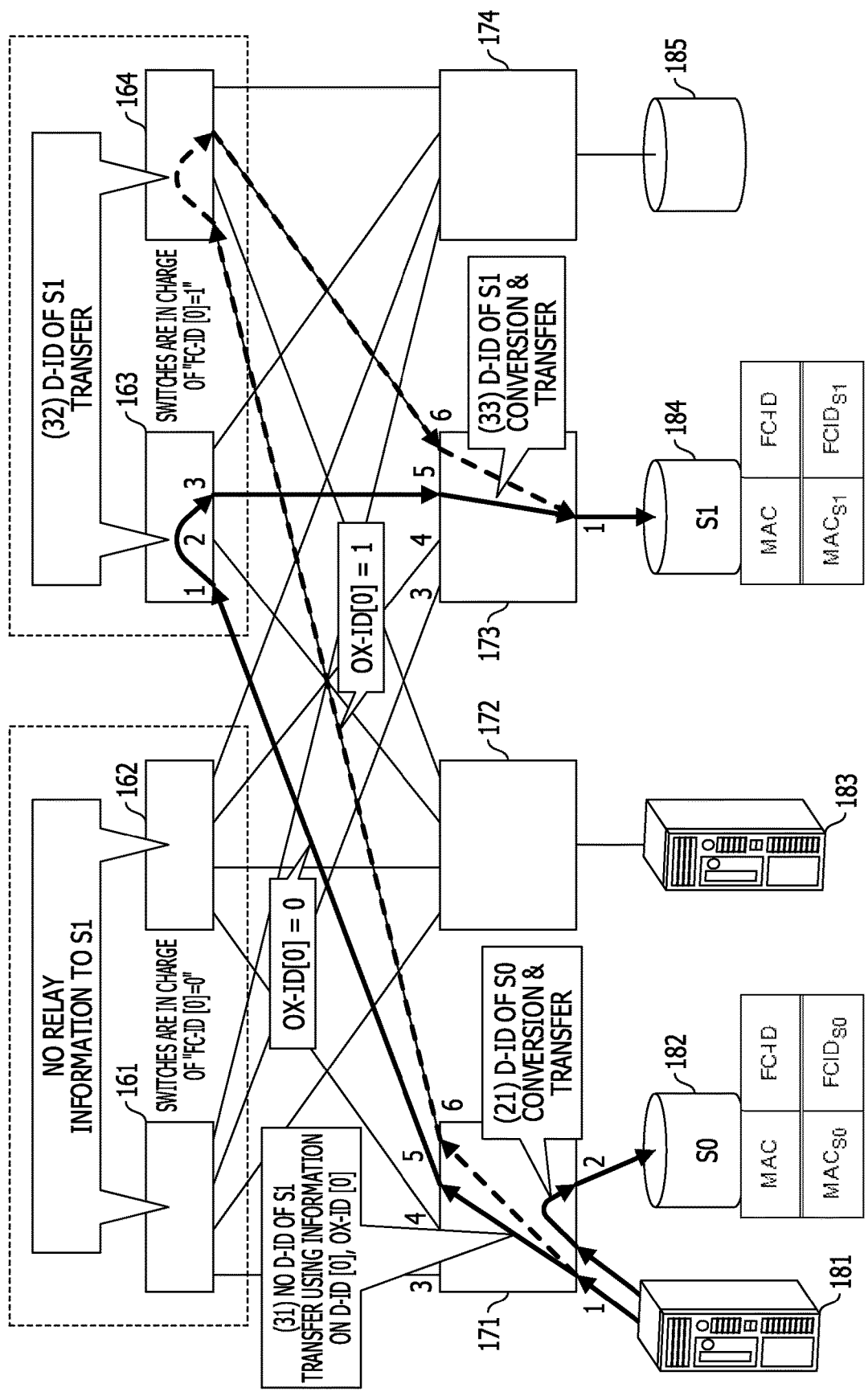
FIG. 13 is a diagram illustrating the outline of a second example.

In this example, as schematically illustrated in FIG. 13, each of the Spine switches 161 and 162 is in charge of an aggregation of end nodes in each of which the least significant bit value of the FC-ID is 0 ("FC-ID [0]=0"), and each of the Spine switches 163 and 164 is in charge of an aggregation of end nodes of "FC-ID [0]=1".

Similar to FIG. 6, each of the Spine switches 163 and 164 is in charge of the disk device 184 (S1), and holds relay information to the disk device 184 (S1). That is, each of the Spine switches 163 and 164 holds a D-ID of the disk device 184 (S1), and performs transfer of a packet.

Each of the Spine switches 161 and 162 is in charge of the disk device 182 (S0), and holds relay information to the disk device 182 (S0). That is, each of the Spine switches 161 and 162 holds a D-ID of the disk device 182 (S0), and performs transfer of a packet.

Even in this example, redundant Spine switches are provided for each aggregation, and the load decentralization may be performed. More specifically, the Spine switches are switched depending on whether or not the least significant bit value of the OX-ID is "1" ("OX-ID [0]=1").

As illustrated in FIG. 13, in a case of "OX-ID [0]=1" of the received packet, the Spine switch 164 is in charge of the received packet, and in a case of "OX-ID [0]=0" of the received packet, the Spine switch 163 is in charge of the received packet.

The Spine switches 161 and 162 are also divided into the Spine switch 162 that is in charge of "OX-ID [0]=1" and the Spine switch 161 that is in charge of "OX-ID [0]=0".

Processing when the server 181 transmits a packet to the disk device 184 (S1) in such an information processing system (third case) is described below. It is assumed that "OX-ID [0]=0" is satisfied in such a packet.

Processing when the server 181 transmits a packet to the disk device 182 (S0) (fourth case) is also described below.

The FCoE relay table 15152 of the Leaf switch 171 includes data as illustrated in FIG. 14.

The first row of FIG. 14 indicates relay information when a packet to the disk device 182 (S0) is received from a further end node. That is, the DA of the received packet is modified to "$MAC_{S0}$", and the SA is modified to "$MAC_{FCF}$", and the received packet is output to the transmission port "2" when the D-ID of the received packet is "$FCID_{S0}$". As illustrated in FIG. 13, to the transmission port "2", the disk device 182 (S0) is coupled.

The second row indicates that the received packet is output to the transmission port "5" without updating the header when the least significant bit value of the D-ID of the received packet is "1", and the least significant bit of the OX-ID is "0". To the transmission port "5", the Spine switch 163 is coupled.

The third row indicates that the received packet is output to the transmission port "6" without updating the header when the least significant bit value of the D-ID of the received packet is "1", and the least significant bit of the OX-ID is "1". To the transmission port "6", the Spine switch 164 is coupled.

The fourth row indicates that the received packet is output to the transmission port "3" without updating the header when the least significant bit value of the D-ID of the received packet is "0", and the least significant bit of the OX-ID is "0". To the transmission port "3", the Spine switch 161 is coupled.

The fifth row indicates that the received packet is output to the transmission port "4" without updating the header when the least significant bit value of the D-ID of the received packet is "0", and the least significant bit of the OX-ID is "1". To the transmission port "4", the Spine switch 162 is coupled.

As described above, in the FCoE relay table 15152 of the Leaf switch 171, relay information of the individual D-ID is included, for the end nodes under the control of the Leaf switch 171, but relay information to the Spine switch that is the transfer destination is merely included, for each combination between the least significant bit value of the D-ID and the least significant bit value of the OX-ID, for end nodes other than the end nodes under the control of the Leaf switch 171.

Thus, in the above-described fourth case, the header of the received packet is matched with the condition of the first row in the FCoE relay table 15152 of the Leaf switch 171 (FIG. 14), so that the Leaf switch 171 executes the above-described modification processing of a header (also referred to as conversion processing), and outputs the received packet to transmission port "2" (Step (21)).

On the other hand, in the third case, in the Leaf switch 171, the header of the received packet is matched with the condition of the second row. That is, the least significant bit value of the FC-ID of the disk device 184 (S1) that is the destination end node is "1", and the least significant bit value of the OX-ID is "0". Thus, the Leaf switch 171 outputs the received packet to the transmission port "5" to which the Spine switch 163 is coupled, without updating the header (Step (31)).

In the FCoE relay table 15152 of the Spine switch 163, data as illustrated in FIG. 15 is included. That is, when the D-ID of the received packet is "$FCID_{S1}$", the received packet is output to the transmission port "3" to which the Leaf switch 173 is coupled. As described above, in the FCoE relay table 15152 of the Spine switch 163, relay information of the FC-ID of the end node that belongs to the aggregation of which the Spine switch 163 is in charge is included.

The Spine switch 163 that has received the packet from the Leaf switch 171 transmits the received packet to the Leaf switch 173 through the transmission port "3" as is without modifying the received packet because the D-ID of the received packet is "$FCID_{S1}$" (Step (32)).

The FCoE relay table 15152 of the Leaf switch 173 includes data as illustrated in FIG. 16.

The first row of FIG. 16 indicates relay information when the packet to the disk device 184 (S1) is received from a further end node. That is, the first row indicates that the DA of the received packet is modified to "$MAC_{S1}$", and the SA is modified to "$MAC_{FCF}$", and the received packet is output to the transmission port "1" when the D-ID of the received packet is "$FCID_{S1}$". As illustrated in FIG. 13, to the transmission port "1", the disk device 184 (S1) is coupled.

The second row indicates that the received packet is output to the transmission port "5" without updating the header when the least significant bit value of the D-ID of the received packet is "1", and the least significant bit of the OX-ID is "0". To the transmission port "5", the Spine switch 163 is coupled.

The third row indicates that the received packet is output to the transmission port "6" without updating the header when the least significant bit value of the D-ID of the received packet is "1", and the least significant bit of the OX-ID is "1". The Spine switch 164 is coupled to the transmission port "6".

The fourth row indicates that the received packet is output to the transmission port "3" without updating the header when the least significant bit value of the D-ID of the received packet is "0", and the least significant bit of the OX-ID is "0". To the transmission port "3", the Spine switch 161 is coupled.

The fifth row indicates that the received packet is output to the transmission port "4" without updating the header when the least significant bit value of the D-ID of the received packet is "0", and the least significant bit of the OX-ID is "1". To the transmission port "4", the Spine switch 162 is coupled.

As described above, in the FCoE relay table 15152 of the Leaf switch 173, relay information of the individual D-ID is included, for the end nodes under the control of the Leaf switch 173, but relay information to the Spine switch that is the transfer destination is merely included, for each combination of the least significant bit value of the D-ID and the least significant bit value of the OX-ID, for end nodes other than the end nodes under the control of the Leaf switch 173.

When the Leaf switch 173 receives a packet from the Spine switch 163 as described above, the Leaf switch 173 modifies the DA of the received packet to "$MAC_{S1}$", and modifies the SA to "MAC$_{FCF}$", in accordance with the first row of the FCoE relay table 15152 because the D-ID is "FCID$_{S1}$". After that, the Leaf switch 173 outputs the packet after the modification, to the associated transmission port "1" (Step (33)).

Transfer of a packet is performed as described above. However, in the FCoE relay table 15152 of the Spine switch, an entry of an end node that belongs to the aggregation of which the Spine switch is in charge, is merely included, so that the processing is dealt with even the capacity of a memory in the Spine switch is small. Also, in the Leaf switch, relay information that is used to perform the transfer to the Spine switch that is the FCF is merely held, for end nodes other than the end nodes under the control of the Leaf switch. The relay information is also identified by a part of the D-ID and a part of the OX-ID, so that the processing is dealt with even when the memory capacity is small.

In a case of "OX-ID [0]=1", as illustrated in the communication flow that is indicated by the dotted line in FIG. 13, the Leaf switch 171 transfers a packet from the transmission port "6" to the Spine switch 164. In addition, similar to the Spine switch 163, the Spine switch 164 transmits a packet to the Leaf switch 173 without modification of the header.

The controller 200 that sets the relay information as illustrated in FIGS. 14 to 16 includes the configuration as illustrated in FIG. 10. However, the processing content of the initial setting unit 210 is similar to that of the first example, so that the description is omitted herein.

Figure 17:
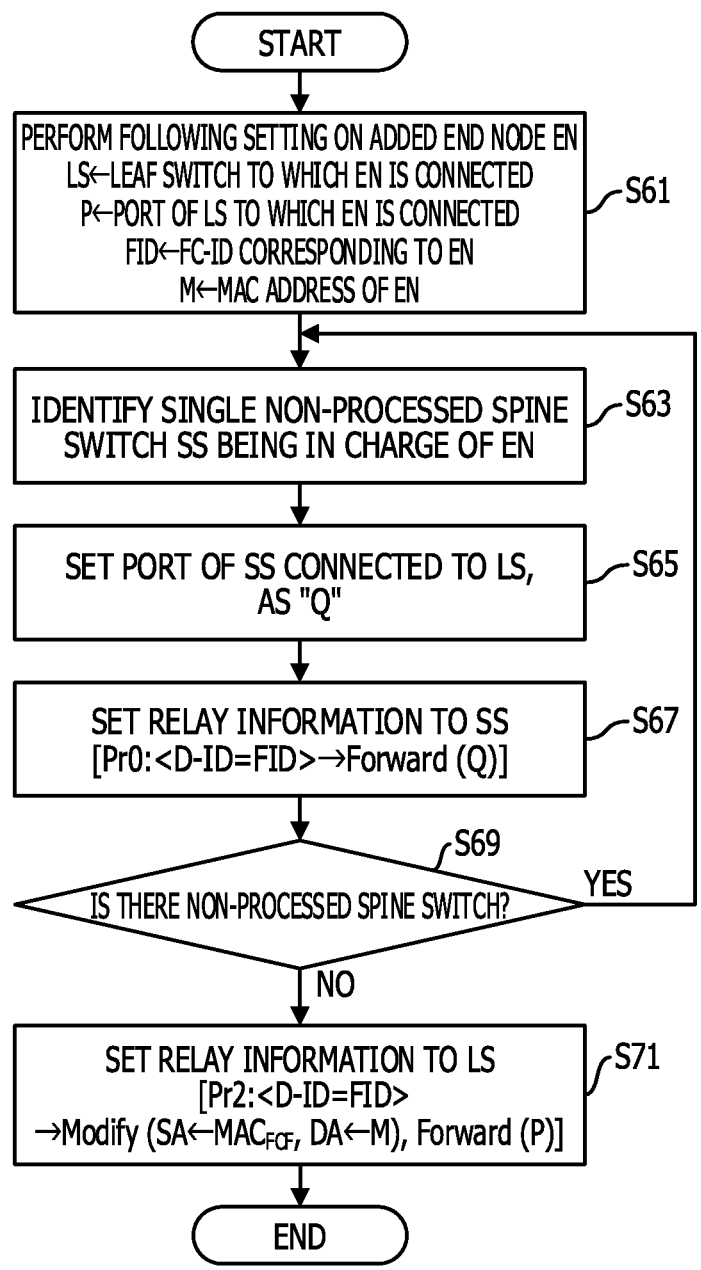
FIG. 17 is a diagram illustrating a processing flow of processing of an addition setting unit, in the second example.

On the other hand, the addition setting unit 220 executes processing as illustrated in FIG. 17. The following processing is executed each time an end node is added to the information processing system.

That is, the addition setting unit 220 executes the following setting, for the added end node EN (S61). More specifically, a Leaf switch to which the end node EN is coupled is set as "LS". A port of the Leaf switch LS to which end node EN is coupled is set as "P". A FC-ID that corresponds to the end node EN is set as "FID". A MAC address of the end node EN is set as "M".

In addition, the addition setting unit 220 identifies a single non-processed Spine switch SS, from among Spine switches that are in charge of the end node EN (S63). The addition setting unit 220 sets the port of the SS that is coupled to the LS, as "Q" (S65).

In addition, the addition setting unit 220 performs setting of relay information, on the identified Spine switch SS (S67). The addition setting unit 220 performs setting of relay information in which the received packet is output to the transmission port Q when the D-ID of the received packet is "FID" (D-ID=FID), using the priority level 0 (Pr0). In accordance with the above-described notation, "Pr0:<D-ID=FID>→Forward (Q)" is obtained.

After that, the addition setting unit 220 determines whether or not a non-processed Spine switch exists in the Spine switches that are in charge of the end node EN (S69). When a non-processed Spine switch exists, the flow returns to S63.

Relay information as illustrated in FIG. 15 is set by executing such processing.

On the other hand, when a non-processed Spine switch does not exist, the addition setting unit 220 performs setting of relay information, on the Leaf switch LS to which the end node EN is coupled (S71). More specifically, the addition setting unit 220 sets relay information in which "MAC$_{FCF}$" is set as the SA of the received packet, and "M" is set as the DA, and the packet after the modification is output to the port P when the D-ID of the received packet is "FID" (D-ID=FID), using the priority level 2 (Pr2). In accordance with the above-described notation, "Pr2:<D-ID=FID>→Modify (SA←MAC$_{FCF}$, DA←M), Forward (P)" is obtained. Therefore, the first rows of FIGS. 14 and 16 are set.

The transfer processing of a packet as illustrated in FIG. 13 is executed when the controller 200 executes the processing as described above.

Due to introduction of the above-described technology, even when low-cost hardware the resource of which is limited is used, an information processing system that includes a lot of end nodes may be established. That is, the improvement of the scalability may be achieved by performing division of the data plane in the FCoE depending on the number of end nodes.

The embodiments that are related to the information processing system and the information processing method in the information communication network are described above, but the embodiments discussed herein are not limited to such embodiments.

For example, the above-described function block configuration is merely an example, and various changes of a function configuration that is used to achieve the similar function may be made. Also, in the processing flow, processing order may be changed, or pieces of processing may be executed in parallel as long as the processing result is not changed.

In addition, various switches may be realized by performing the above-described processing using a circuit in a dedicated LSI, or by causing the processor to execute a program that is used to achieve the above-described function.

Figure 18:
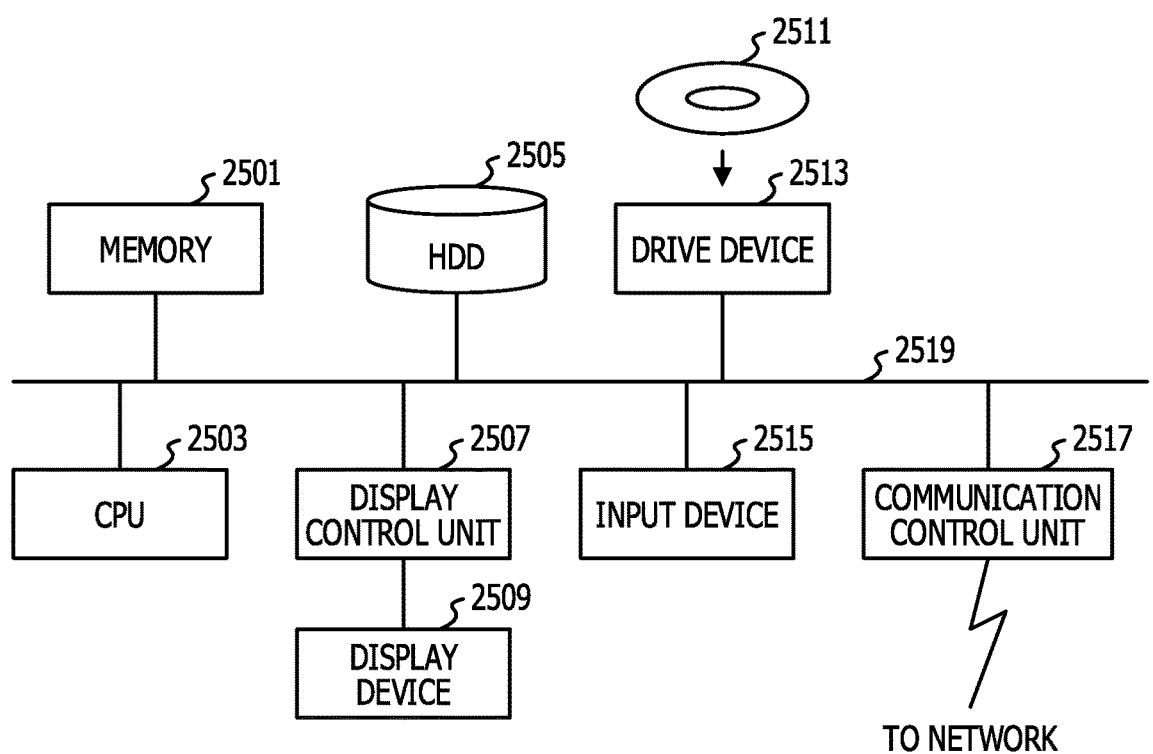
FIG. 18 is a functional block diagram of a computer.

The above-described controller 200 is, for example, a computer device. As illustrated in FIG. 18, in the controller 200, a memory 2501, a CPU 2503, a hardware disk drive (HDD) 2505, a display control unit 2507 that is coupled to a display device 2509, a drive device 2513 for a removable disk 2511, an input device 2515, and a communication controller 2517 that is used to perform the connection to the network are coupled to each other through a bus 2519. An operating system (OS) and an application program that is used to execute the processing in the examples are stored in the HDD 2505, and are executed by the CPU so as to be read from the HDD 2505 to the memory 2501. The CPU 2503 controls the display control unit 2507, the communication controller 2517, and the drive device 2513 to perform certain operations depending on a processing content of the application program. Data in the middle of the processing is mainly stored in the memory 2501, but may be stored in the HDD 2505. In the examples of the technology discussed herein, the application program that is used to execute the above-described processing is stored in a computer-readable removable disk 2511, distributed, and installed from the drive device 2513 to the HDD 2505. Through the network such as the Internet and the communication controller 2517, the application program may be installed to the HDD 2505. Such a computer device achieves the above-described various functions through the organic cooperation of the above-described hardware such as the CPU 2503 and the memory 2501, and programs such as the OS and the application program.

The outline of the above-described embodiments is as follows.

An information processing system according to an embodiment includes (A) a plurality of nodes that is classified into a plurality of aggregations, (B) a plurality of first switches each of which is coupled to at least one of the plurality of nodes, and includes first relay information on the node to which the first switch is coupled, and (C) a plurality of second switches each of which relays packets from the plurality of first switches, and includes second relay information on an aggregation of which the second switch is in charge, among the plurality of aggregations. In addition, (d1) when a first node among the above-described plurality of nodes transmits a first packet that is destined for a second node that belongs to a first aggregation among the plurality of aggregations, to a first switch to which the first node is coupled, (d2) the first switch to which the first node is coupled receives the first packet, and transmits the first packet to a second switch that is in charge of the aggregation to which the second node belongs, based on first relay information and destination information of the first packet when the second node is not coupled to the first switch. In addition, (d3) when the second switch that is in charge of the first aggregation receives the first packet, the second switch transmits the first packet to the first switch to which the second node is coupled, based on second relay information and the destination information of the first packet. (d4) In addition, when the first switch to which the second node is coupled receives the first packet, the first switch transmits the first packet to the second node.

Due to introduction of such an information processing system, the processing is decentralized between the plurality of second switches, the processing is dealt with even when the number of nodes is increased.

In addition, each of the above-described plurality of nodes may include a first address (for example, a MAC address) and a second address (for example, an FC-ID). In this case, the above-described first node performs transmission of a first packet that includes destination information including a certain address (for example, a MAC address of the FCF in the embodiment) as the first address, a second address of the second node, as the second address. In this case, a second switch that is in charge of an aggregation to which the second node belongs changes the certain address that is included in the destination information of the first packet, to the first address of the second node. Therefore, routing of a packet is performed correctly.

Each of the above-described plurality of nodes may include a first address (for example, a MAC address) and a second address (for example, an FC-ID). In this case, the above-described first node performs transmission of a first packet that includes destination information including a certain address (for example, a MAC address of the FCF in the embodiment), as the first address, and a second address of the second node, as the second address. In this case, the first switch to which the second node is coupled changes the certain address that is included in the destination information of the first packet, to the first address of the second node. Therefore, routing of a packet is performed correctly.

The above-described first relay information may further include information that is used to identify, for each of the aggregations, a port that corresponds to the second switch that is in charge of the aggregation, from a part of destination information of the packet. Therefore, a data amount of the first relay information may be reduced.

The above-described second relay information may include information that is used to identify a port that corresponds to a node that belongs to the aggregation of which the second switch is in charge, from the entire destination information of the packet. Even when the number of plurality of nodes is increased, a data amount of the second relay information may be reduced as long as the number of aggregations is increased.

In addition, when there is a plurality of second switches that are in charge of an identical aggregation, the above-described first relay information may further include information that is used to identify, for each of the aggregations, a port that corresponds to the second switch that is in charge of the aggregation, from a part of destination information of the packet and identification information of the packet (for example, OX-ID or SA). Therefore, the load decentralization may be achieved.

A program that causes the processor to execute the above-described processing may be created, and the program is stored, for example, in a computer-readable storage medium or storage device such as a flexible disk, an optical disk of a compact disc-read-only memory (CD-ROM) or the like, a magneto optical disk, a semiconductor memory (for example, read-only memory (ROM)), a hard disk. Data in the middle of processing is temporarily stored in a storage device such as a random-access memory (RAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing system comprising:
a plurality of nodes respectively classified into one of a plurality of aggregations;
a plurality of first switches coupled to at least one of the plurality of nodes, each of the plurality of first switches including first relay information that indicates information of nodes that are provided under a control of the each of the plurality of first switches, among the plurality of nodes, the first relay information including information in which a header, a condition related to the header, a modification processing of the header and a transmission port are associated with each other for each of a plurality of headers, the plurality of headers having priorities which are different from each other; and
a plurality of second switches each being coupled to the plurality of first switches, and each including second relay information that identifies an aggregation which a switch is in charge of among the plurality of aggregations, wherein
a first node among the plurality of nodes transmits a first packet that includes destination information indicating that a destination is a second node, to a first switch coupled to the first node among the plurality of first switches, and
the first switch coupled to the first node is configured to:
specify the condition related to the header included in the first packet by referring to the first relay information in accordance with the priorities,
when the modification processing corresponding to the specified condition is defined in the first relay information, execute the defined modification processing, and
transmit the first packet to a second switch that is in charge of the aggregation of the second node among the plurality of second switches, through the transmission port corresponding to the specified condition, the second switch transmits the first packet to a first switch coupled to the second node, among the plurality of first switches, based on the destination information and the second relay information, and the first switch coupled to the second node transmits the first packet to the second node wherein a media access control (MAC) address and a Fibre Channel identifier (FC-ID) are assigned to each of the plurality of nodes, and the first node transmits the first packet having the header including the destination information that includes a predetermined address as the MAC address and the FC-ID of the second node, wherein the second switch that is in charge of the aggregation to which the second node belongs changes, based on the FC-ID, the predetermined address that is included in the destination information of the first packet, to the MAC address that corresponds to the second node, without adding a new header, and the first switch to which the second node is coupled changes, based on the FC-ID, the predetermined address that is included in the destination information of the first packet, to the MAC address that corresponds to the second node, without adding the new header.

2. The information processing system according to claim 1, wherein the first relay information further includes information that is used to identify, for each of the plurality of aggregations, a port that corresponds to the second switch that is in charge of the aggregation, based on the destination information of the packet.

3. The information processing system according to claim 1, wherein the second relay information includes information that is used to identify a port that corresponds to the node that belongs to the aggregation which the second switch is in charge of, based on the destination information of the packet.

4. The information processing system according to claim 1, wherein when there are two or more second switches that are in charge of an identical aggregation among the plurality of second switches, the first relay information further includes information that is used to identify, for each type of the plurality of aggregations, a port that corresponds to the second switch that is in charge of the aggregation, based on the destination information of the packet and the identification information included in the packet.

5. The information processing system according to claim 1, wherein the plurality of nodes are classified into the plurality of aggregations by using a part of identifier that is included in each of the plurality of nodes.

6. The information processing system according to claim 5, wherein the part of identifier is a least significant value of the identifier.

7. The information processing system according to claim 1, further comprising a controller coupled to the first switch and having a direct or indirect path to each of the plurality of first switches and the plurality of second switches, the controller configured to:

collect topology information of a network that includes the information processing system, identifiers of the plurality of nodes and location information of the plurality of nodes, and instruct setting of the first relay information and the second relay information based on the topology information, the identifiers and the location information.

8. The information processing system according to claim 1, wherein first relay information is information in which a header, a condition related to the header, a modification processing of the header and a transmission port are associated with each other for each of a plurality of headers, the plurality of headers having priorities which are different from each other.

9. The information processing system according to claim 8, wherein the first switch coupled to the first node is configured to:

specify the condition corresponding to the header included in the first packet by referring to the first relay information in accordance with the priorities, when the modification processing corresponding to the specified condition is defined in the first relay information, execute the defined modification processing, and transmit the first packet through the transmission port corresponding to the specified condition.

10. The information processing system according to claim 1, wherein the first switch is configured to perform a transfer of the first packet using a part of information that is used to identify an end node aggregation of which a switch that corresponding to a turnaround point is in charge, from among the plurality of aggregations.

11. The information processing system according to claim 10, wherein the first switch is configured to when a plurality of switches each of which corresponds to the turnaround point exists for a single end node aggregation, perform a load decentralization using a first identifier of the first node.

12. The information processing system according to claim 10, wherein the first switch is configured to when a plurality of switches each of which corresponds to the turnaround point exists for a single end node aggregation, perform a load decentralization using a second identifier on communication management included in a header of a Fibre Channel (FC) frame encapsulated in the first packet.

13. The information processing system according to claim 1, wherein the condition related to the header in the first relay information includes a destination MAC address (DA), a FC destination ID (D-ID) that indicates the FC-ID of a destination end node, and a FC exchange ID (OX-ID).

14. The information processing system according to claim 1, wherein the information processing system is a system on a network that applies Fibre Channel over Ethernet (FCoE).

15. A communication method executed by an information processing system that includes a plurality of nodes, a plurality of first switches being coupled to at least one of the plurality of nodes respectively classified into one of a plurality of aggregations, each of the plurality of first switches including first relay information that indicates information of nodes that are provided under a control of the each of the plurality of first switches, among the plurality of nodes, the first relay information including information in which a header, a condition related to the header, a modification processing of the header and a transmission port are associated with each other for each of a plurality of headers, the plurality of headers having priorities which are different from each other, and a plurality of second switches respectively coupled to the plurality of first switches, and includes second relay information that identifies an aggregation which a switch is in charge of, among the plurality of aggregations, the communication method comprising:

transmitting, by a first node among the plurality of nodes, a first packet that includes destination information indicating that a destination is a second node, to a first switch coupled to the first node among the plurality of first switches;

specifying the condition related to the header included in the first packet by referring to the first relay information in accordance with the priorities, when the modification processing corresponding to the specified condition is defined in the first relay information, executing the defined modification processing;

transmitting the first packet to a second switch that is in charge of the aggregation of the second node among the plurality of second switches, through the transmission port corresponding to the specified condition;

transmitting, by the second switch, the first packet to the first switch coupled to the second node, among the plurality of first nodes, based on the destination information and the second relay information; and transmitting, by the first switch coupled to the second node, the first packet to the second node, wherein a media access control (MAC) address and a Fibre Channel identifier (FC-ID) are assigned to each of the plurality of nodes, and the transmitting by the first node among the plurality of nodes includes transmitting the first packet having the header including the destination information that includes a predetermined address as the MAC address and the FC-ID of the second node, wherein the transmitting by the second switch includes changing, based on the FC-ID, the predetermined address that is included in the destination information of the first packet, to the MAC address that corresponds to the second node, without adding a new header, and the transmitting by the first switch coupled to the second node includes changing, based on the FC-ID, the predetermined address that is included in the destination information of the first packet, to the MAC address that corresponds to the second node, without adding the new header.

\* \* \* \* \*